United States Patent

Gonidec et al.

[11] Patent Number: 5,937,636
[45] Date of Patent: Aug. 17, 1999

[54] PIVOTING DOOR THRUST REVERSER WITH CONTROLLED BYPASS THROUGH THE REAR PORTION OF THE THRUST REVERSER DOOR

[75] Inventors: Patrick Gonidec, Montivilliers; Pascal Gérard Rouyer, Saint Aubin Routot; Guy Bernard Vauchel, Mendes, all of France

[73] Assignee: Societe HISPANO-SUIZA, Paris, France

[21] Appl. No.: 08/941,633

[22] Filed: Oct. 2, 1997

[30] Foreign Application Priority Data

Oct. 10, 1996 [FR] France ................................. 96 12354

[51] Int. Cl.⁶ ........................................................ F02K 3/02
[52] U.S. Cl. ...................... 60/226.2; 60/230; 244/110 B; 239/265.31
[58] Field of Search .................................... 60/226.2, 230; 244/110 B; 239/265.25, 265.27, 265.59, 265.31

[56] References Cited

U.S. PATENT DOCUMENTS

| | | |
|---|---|---|
| 2,847,823 | 8/1958 | Brewer . |
| 3,279,182 | 10/1966 | Helmintoller . |
| 3,601,992 | 8/1971 | Maison . |
| 3,605,411 | 9/1971 | Maison et al. . |
| 3,699,682 | 10/1972 | Kleckner ................................. 60/226.2 |
| 4,894,985 | 1/1990 | Dubois et al. . |
| 5,039,171 | 8/1991 | Lore . |
| 5,040,730 | 8/1991 | Hogie et al. . |
| 5,347,808 | 9/1994 | Standish et al. ........................ 60/226.2 |

FOREIGN PATENT DOCUMENTS

| | | |
|---|---|---|
| 0 368 725 | 5/1990 | European Pat. Off. . |
| 0 413 635 | 2/1991 | European Pat. Off. . |
| 0 728 933 | 8/1996 | European Pat. Off. . |
| 1482538 | 4/1967 | France . |
| 2030034 | 10/1970 | France . |
| 2 618 853 | 2/1989 | France . |
| 2 741 910 | 6/1997 | France . |

*Primary Examiner*—Timothy S. Thorpe
*Assistant Examiner*—Ted Kim
*Attorney, Agent, or Firm*—Bacon & Thomas, PLLC

[57] ABSTRACT

A thrust reverser is disclosed for an aircraft turbojet engine having a cowling with an inner surface forming an outer boundary of a gas flow duct, the cowling having at least one reverse thrust opening and a thrust reverser door pivotally attached to the cowling so as to move between a forward thrust position, wherein the thrust reverser door closes the at least one reverse thrust opening and a reverse thrust position, wherein a forward portion of the thrust reverser door moves outwardly from the cowing and a rear portion of the door moves inwardly into the gas flow duct so as to redirect a first portion of the gases flowing through the gas flow duct through the reverse thrust opening. The thrust reverser also includes a passageway bounded at least in part by the rear portion of the thrust reverser door located in the gas flow duct when the thrust reverser door is in the reverse thrust position, the passageway enabling a second portion of the gases flowing through the gas flow duct to pass to the rear of the thrust reverser door and to redirect this second portion of gases in an oblique direction relative to the gas flow duct to eliminate any forward thrust developed by the second portion of gases.

24 Claims, 13 Drawing Sheets

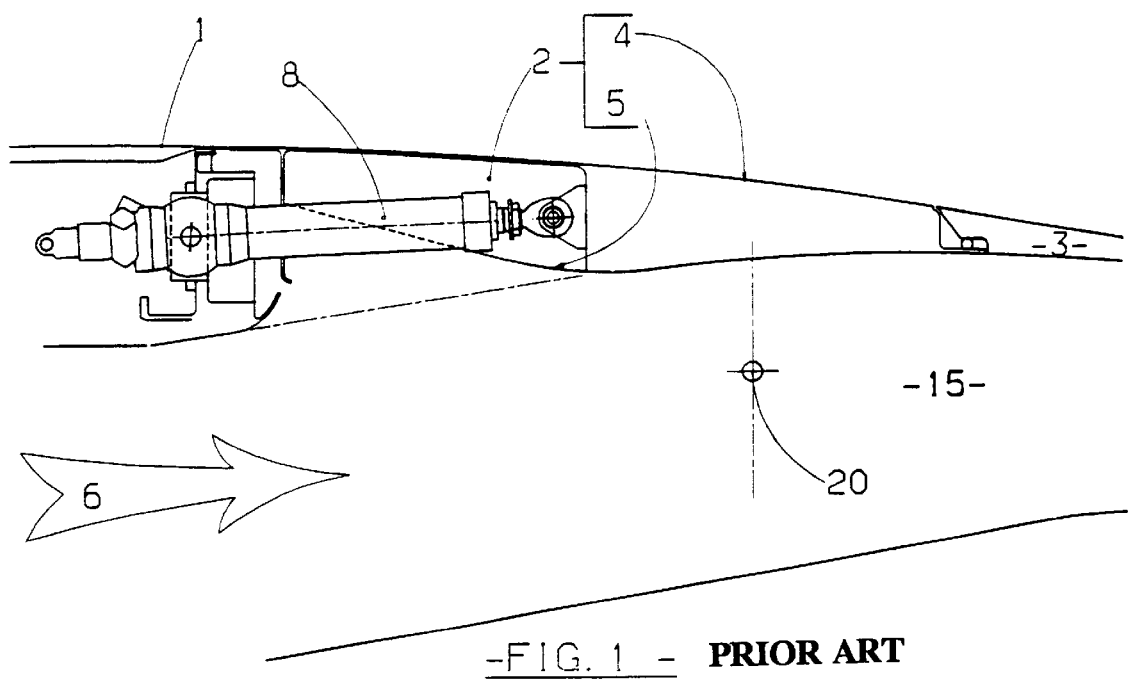
-FIG. 1 -  PRIOR ART
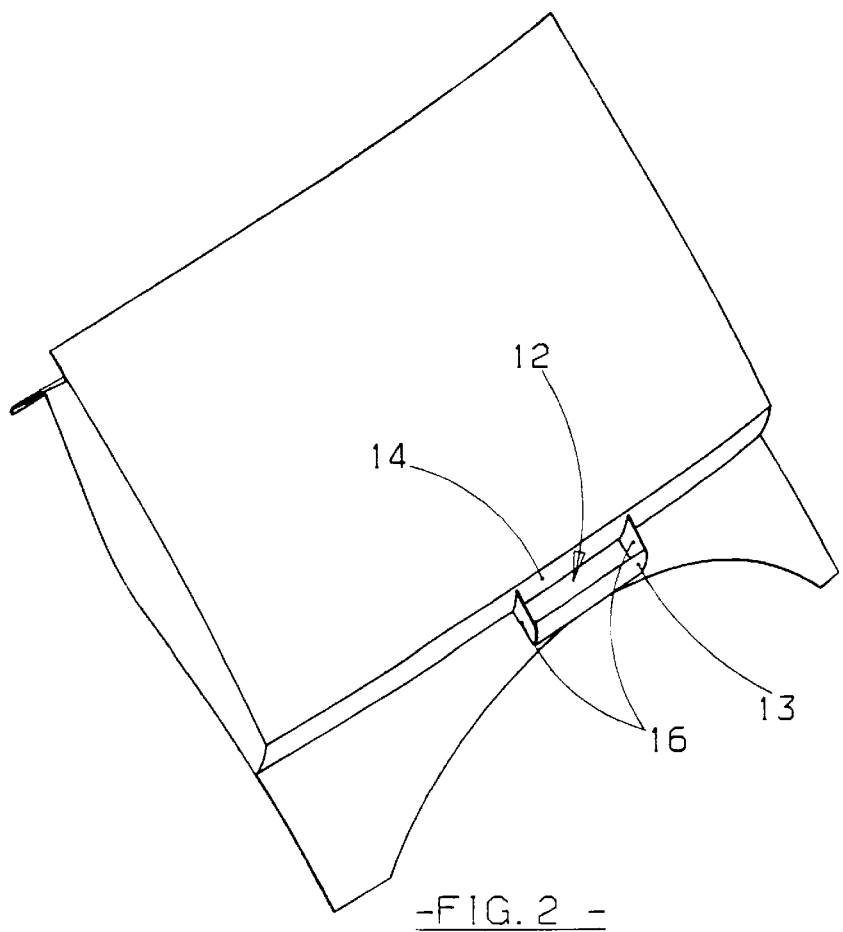
-FIG. 2 -

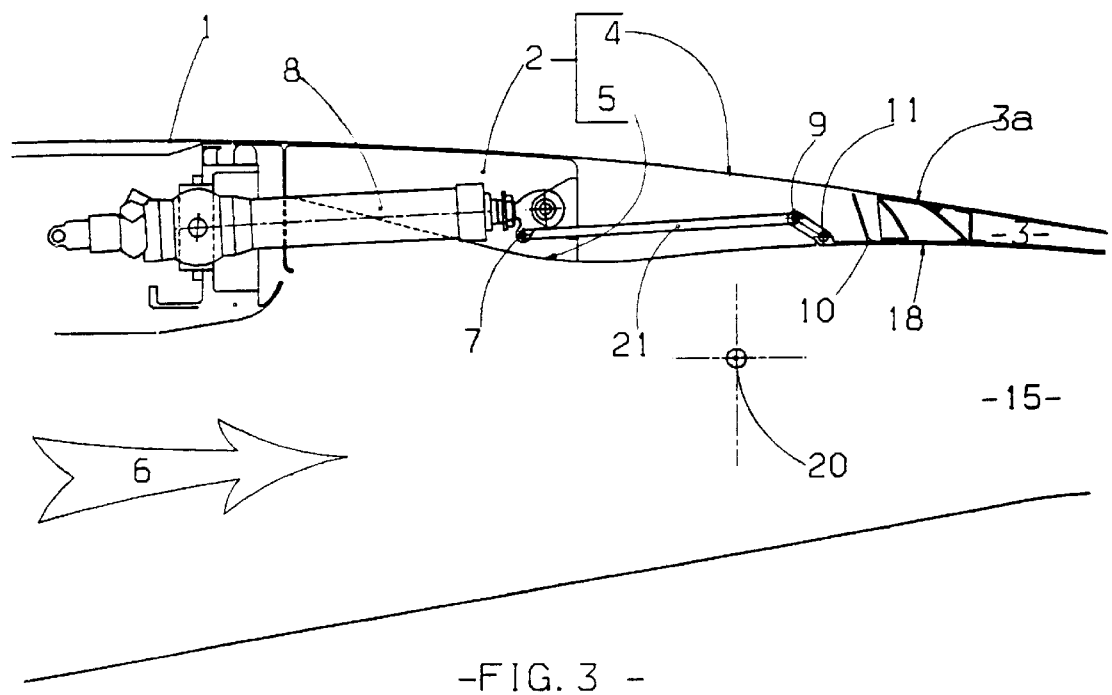
-FIG. 3-
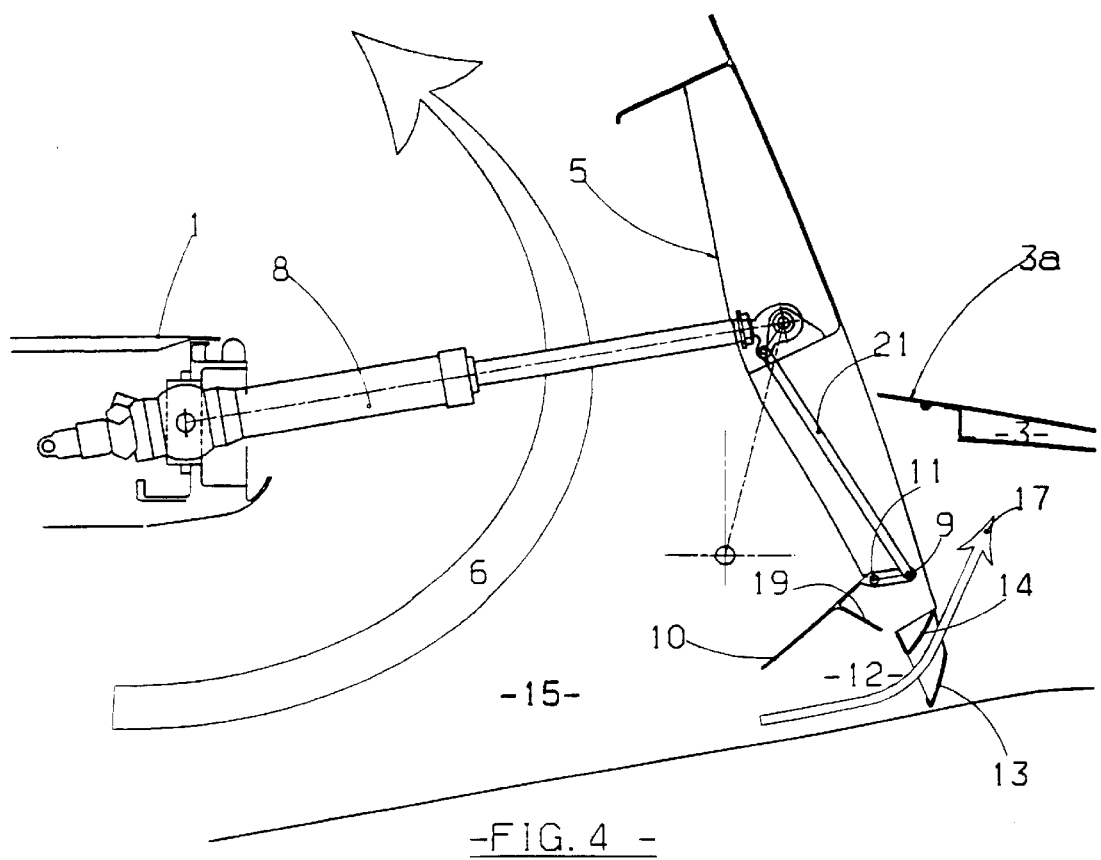
-FIG. 4-

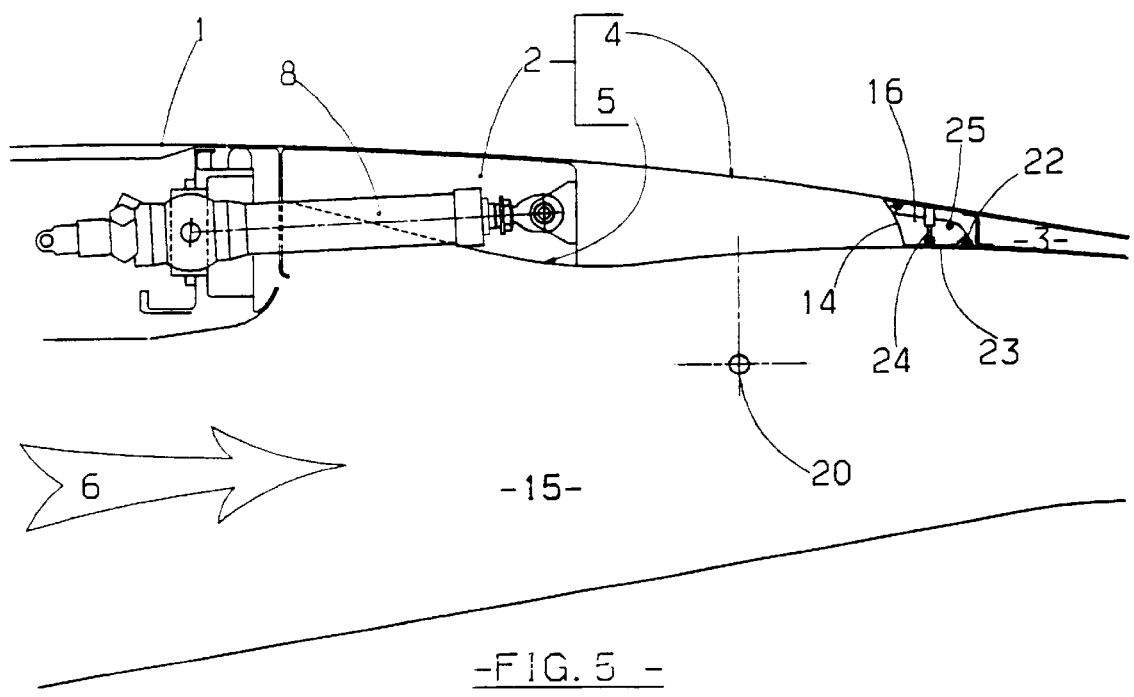
-FIG. 5 -
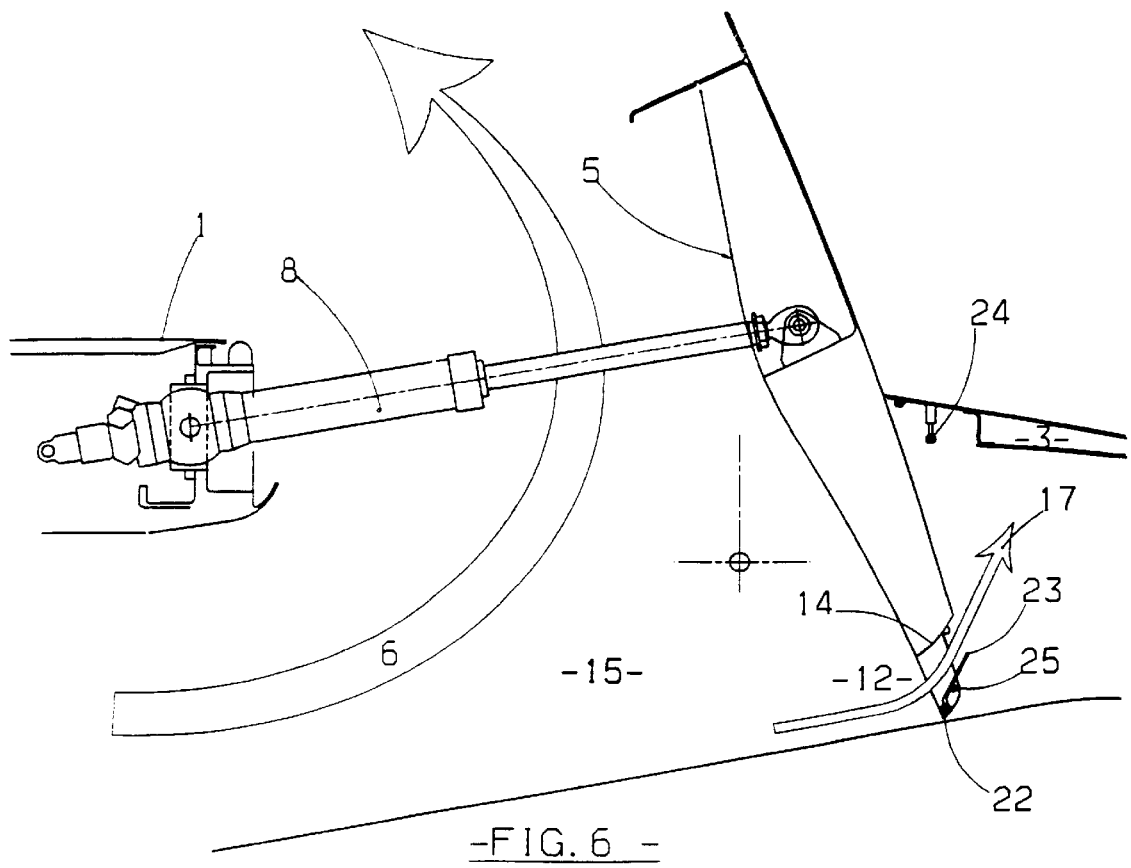
-FIG. 6 -

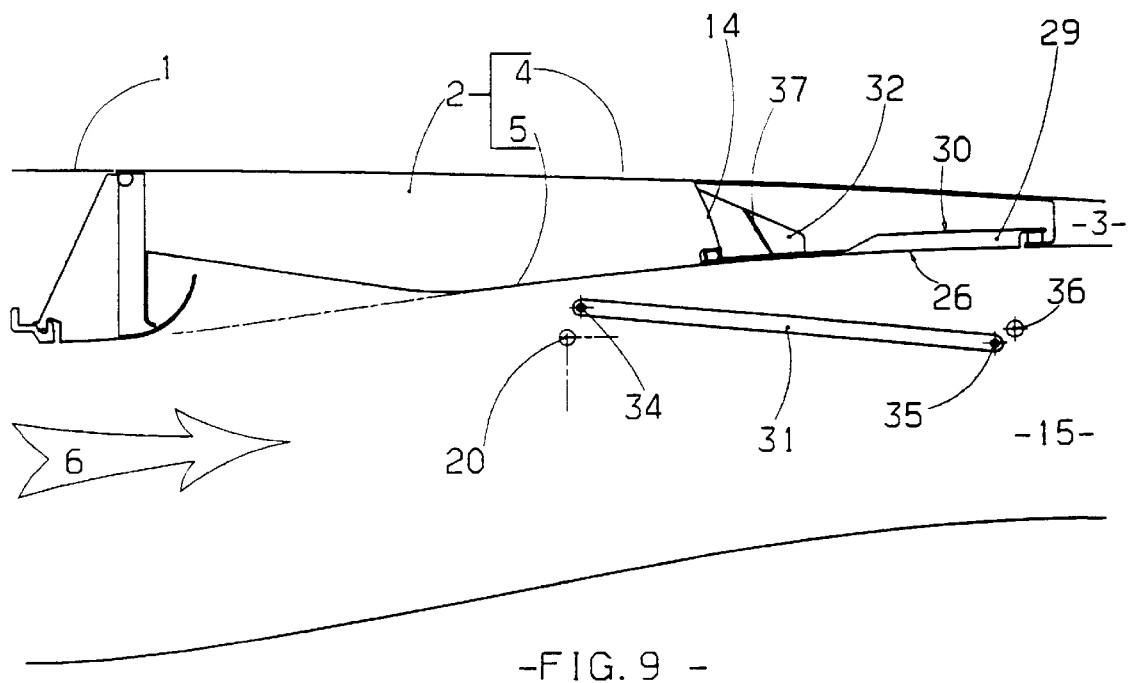
-FIG. 9 -
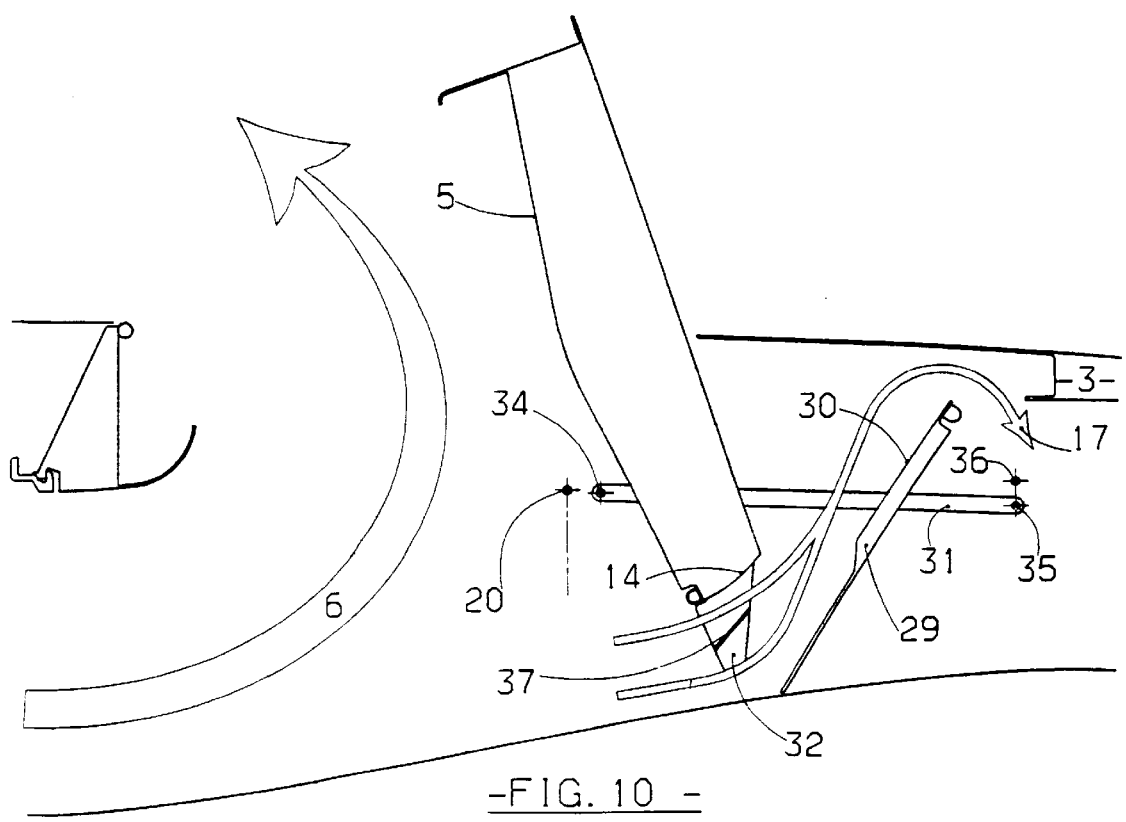
-FIG. 10 -

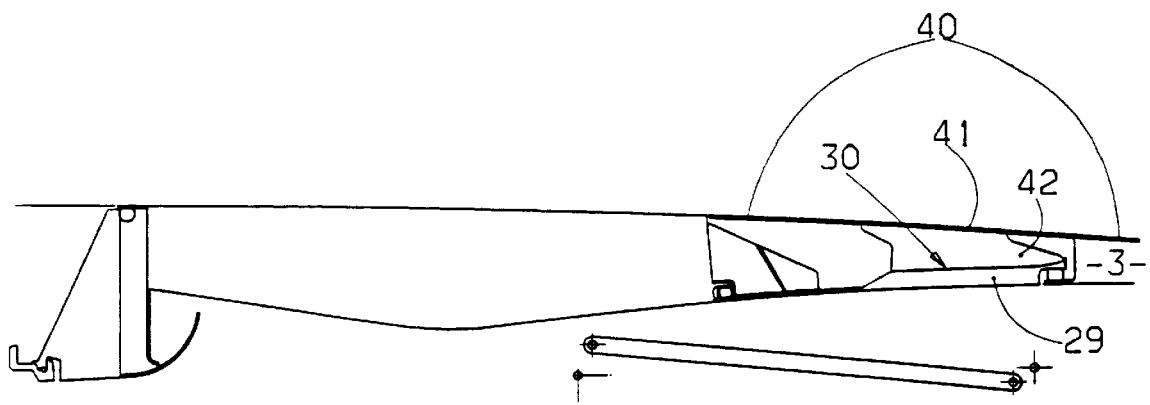
-FIG. 11 -
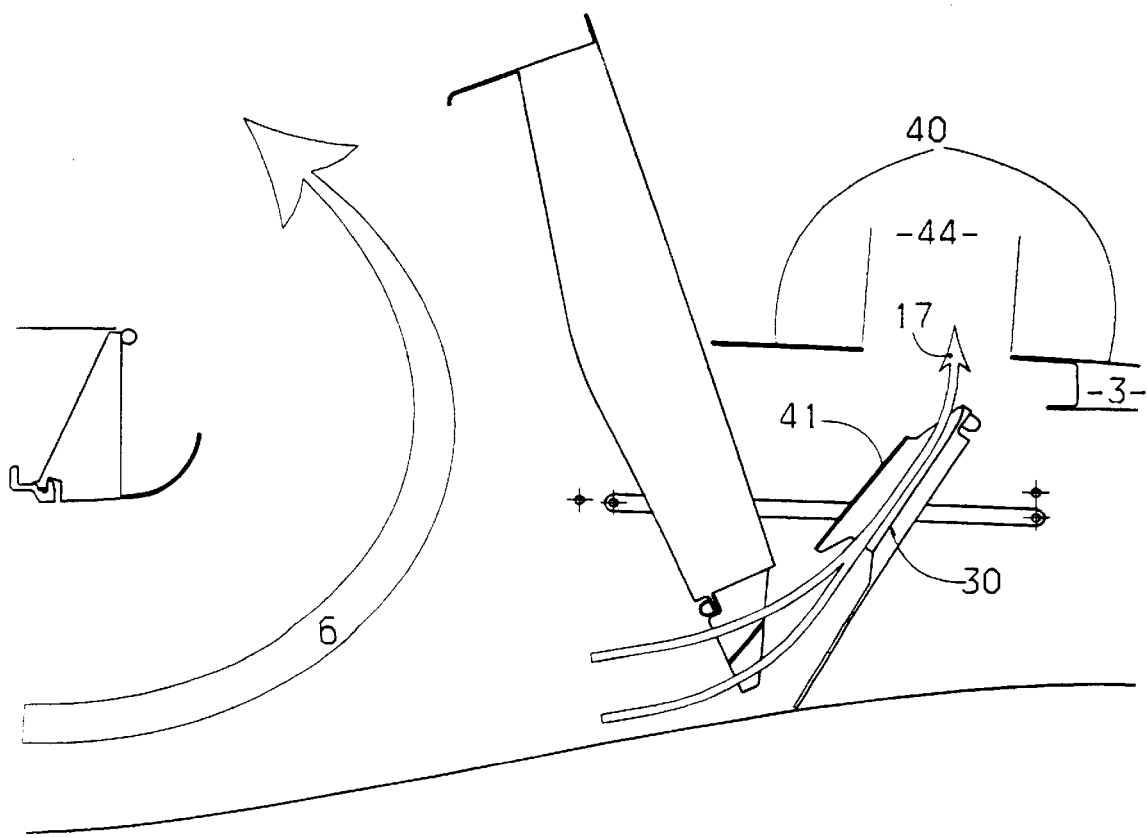
-FIG. 12 -

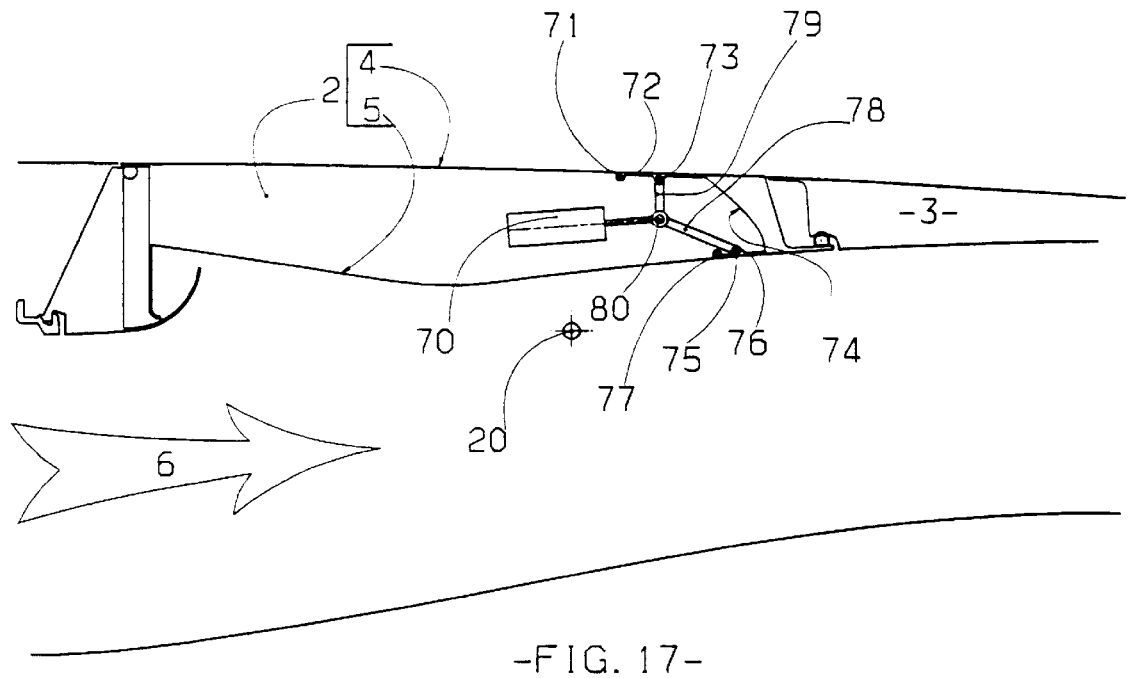
-FIG. 17-
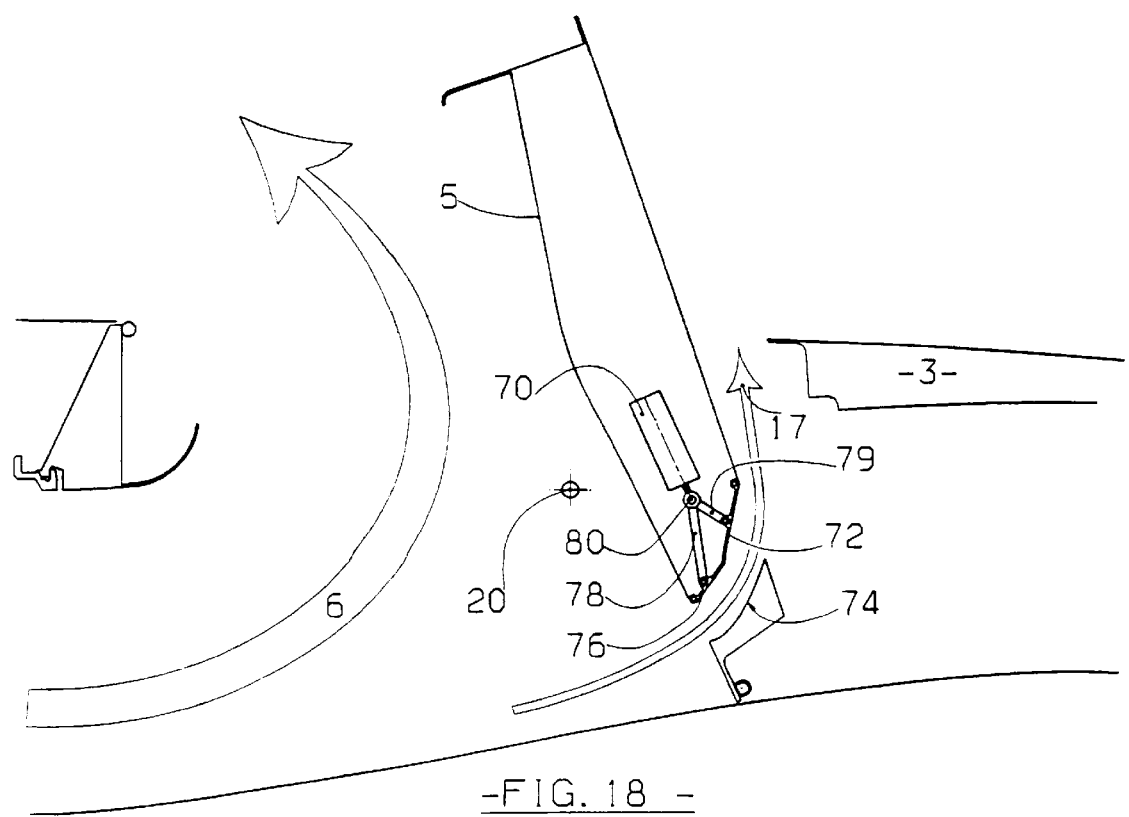
-FIG. 18-

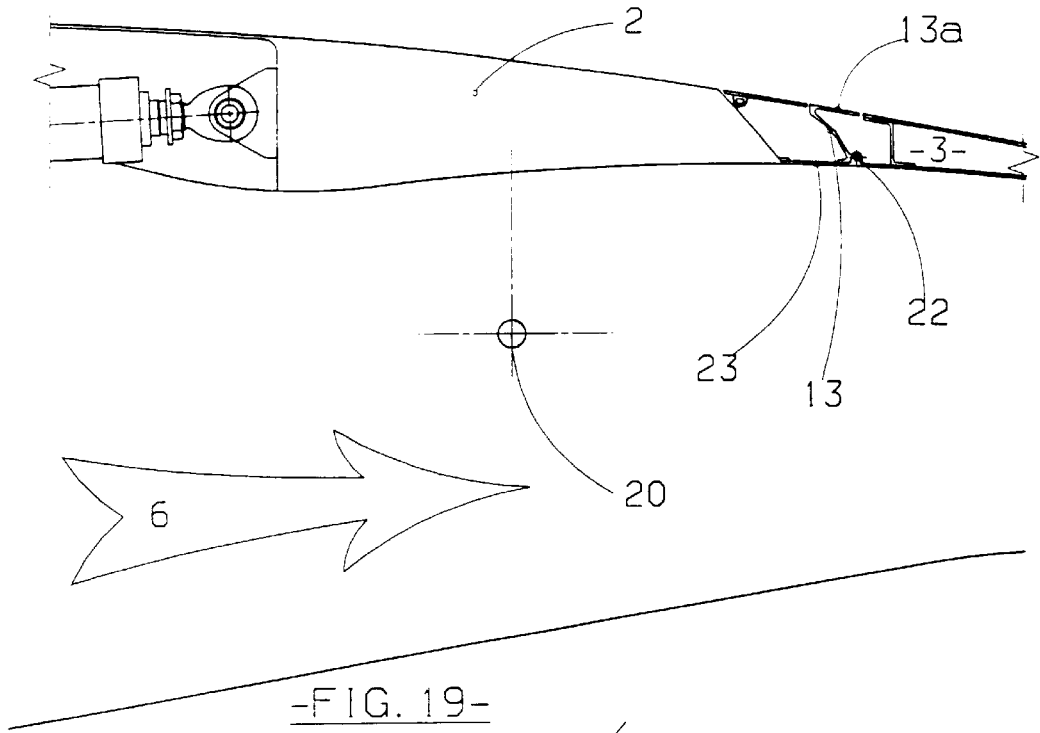
-FIG. 19-
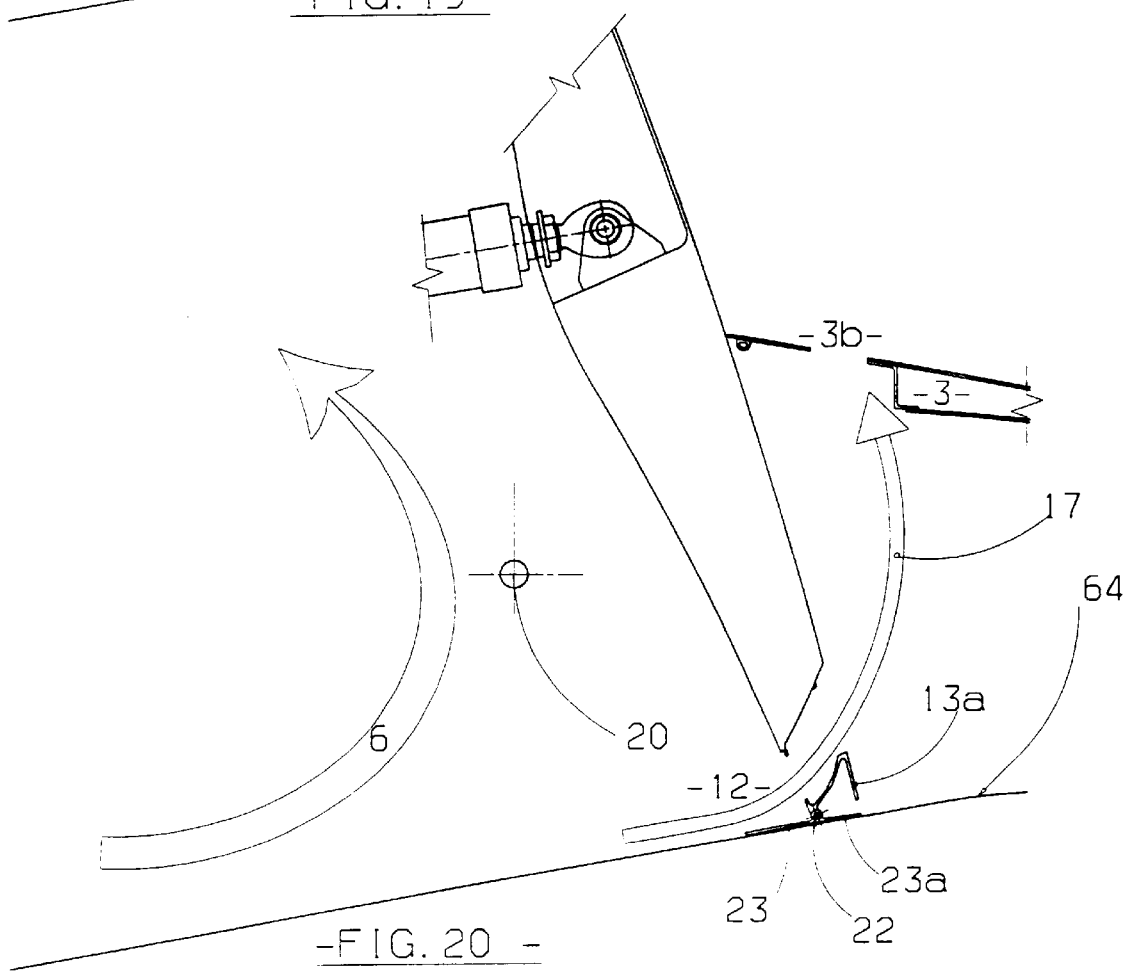
-FIG. 20-

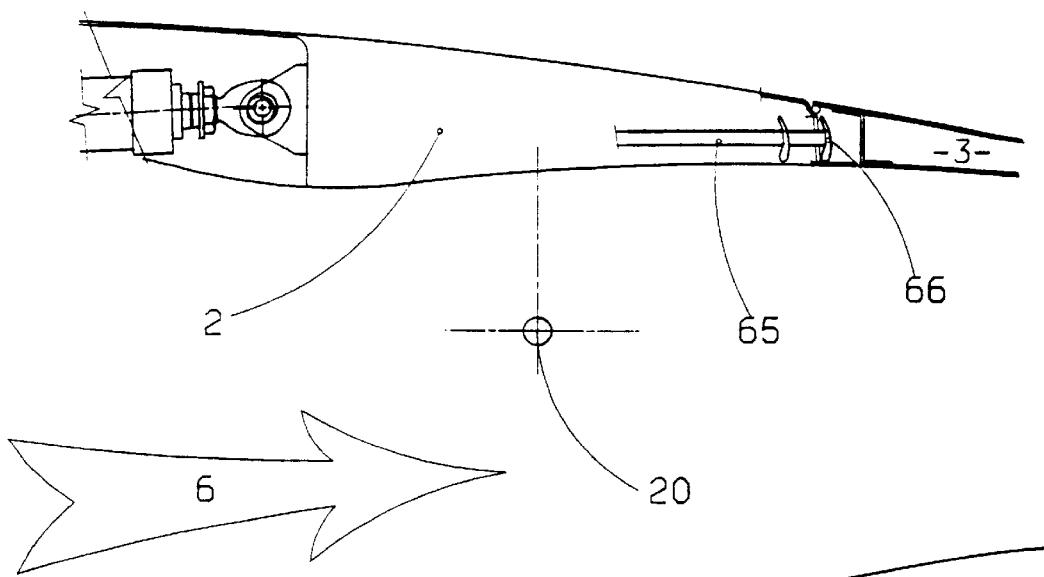
-FIG. 21 -
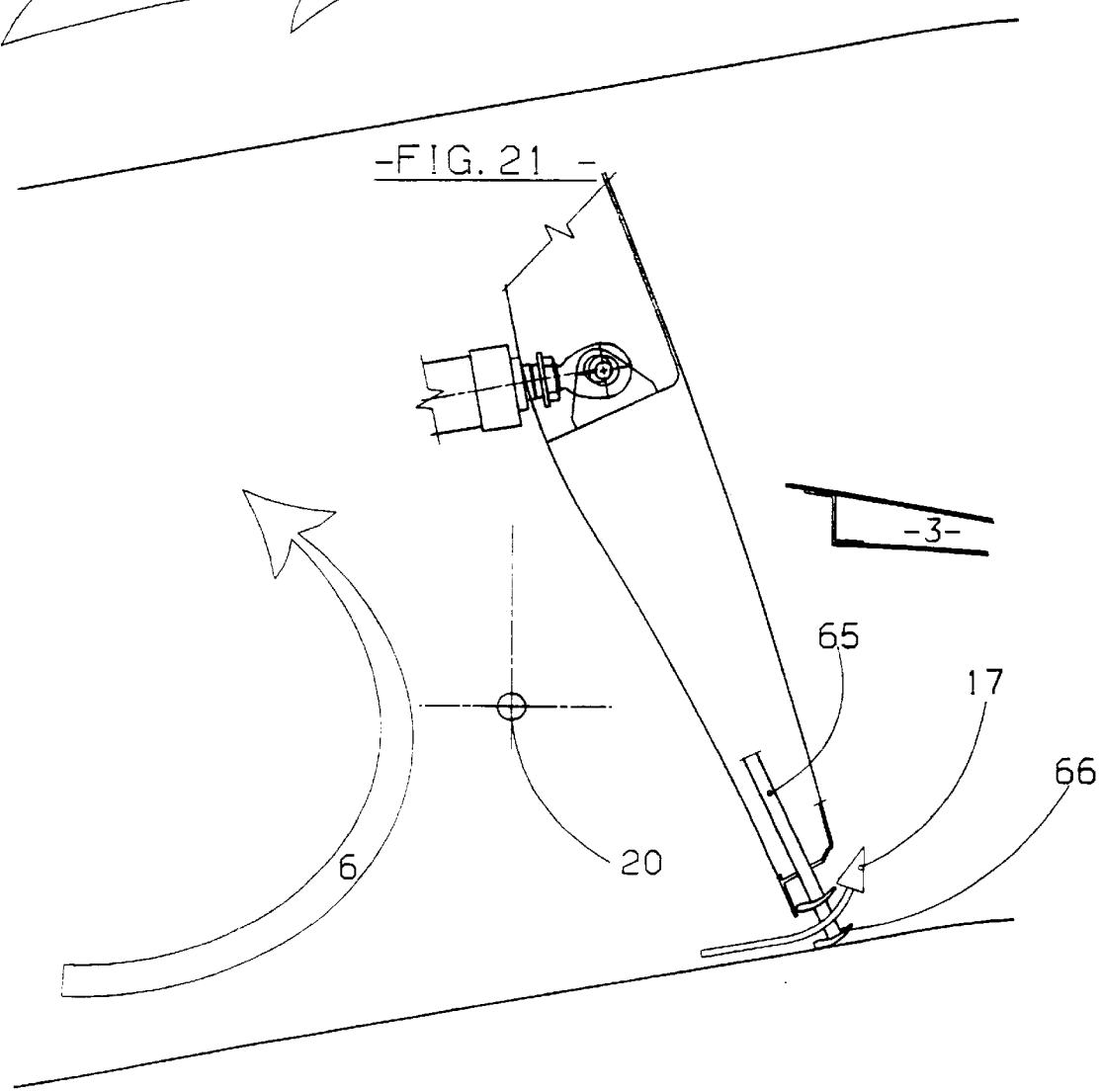
-FIG. 22 -

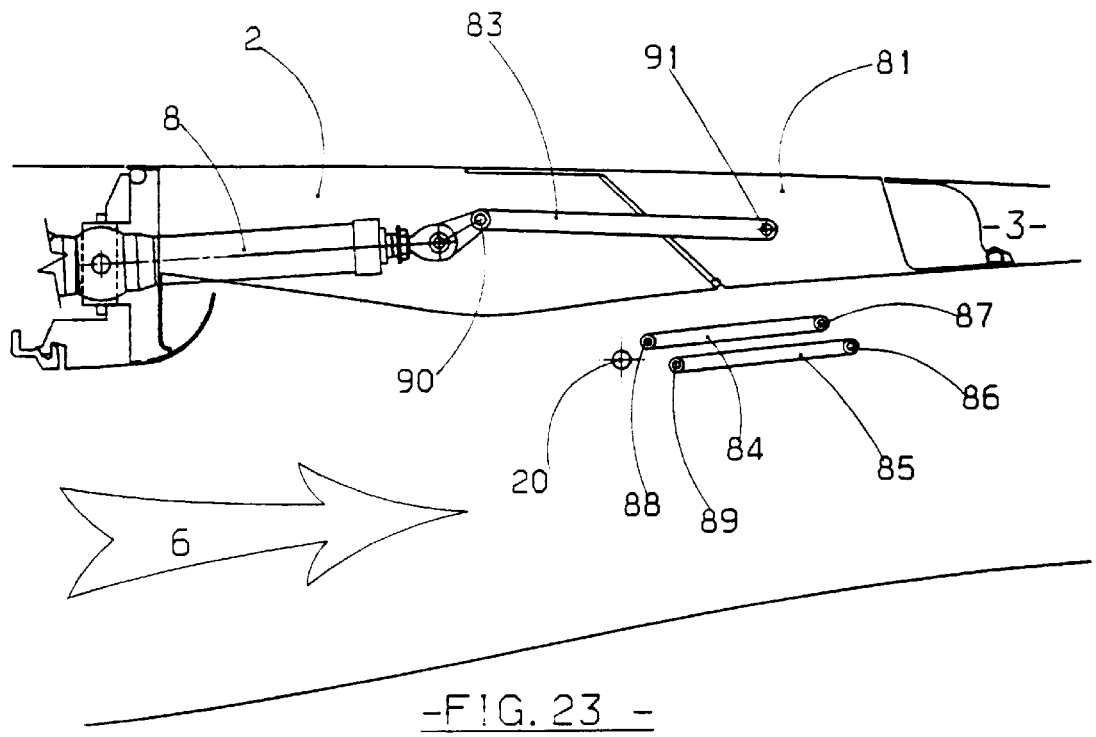
-FIG. 23 -
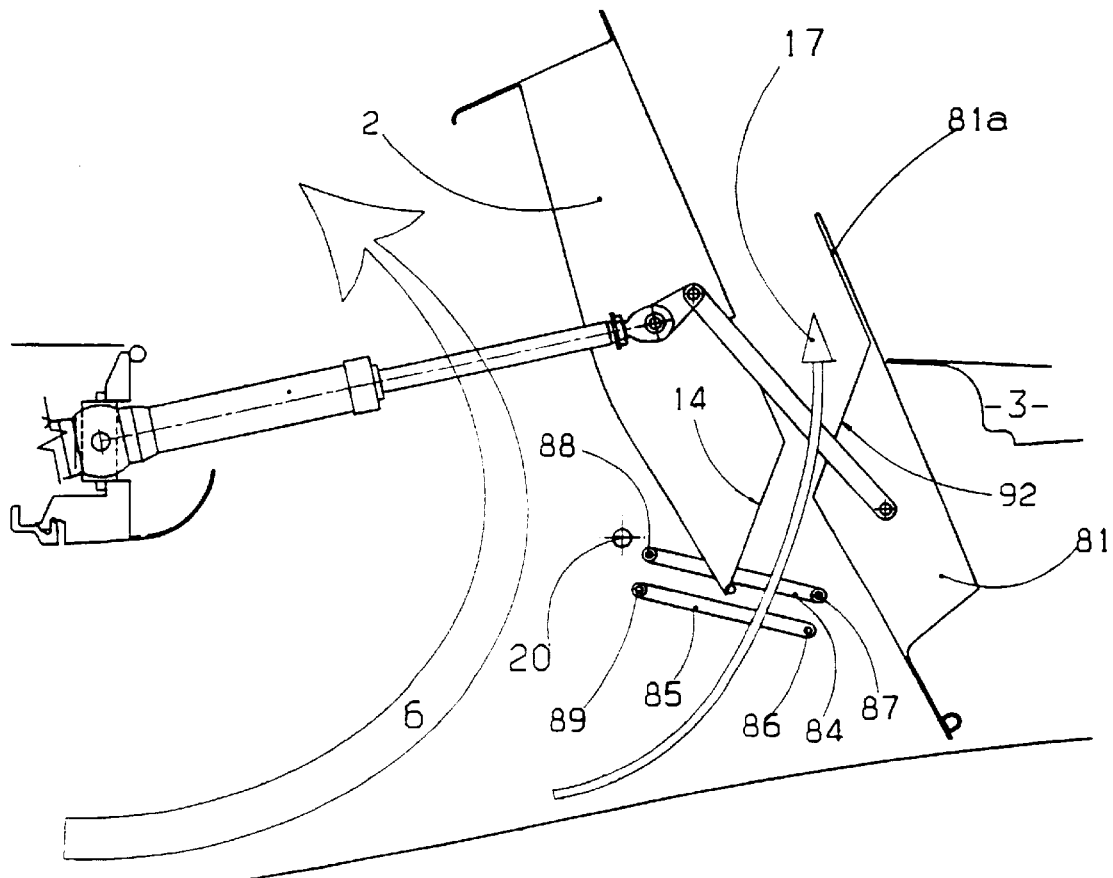
-FIG. 24 -

PIVOTING DOOR THRUST REVERSER WITH CONTROLLED BYPASS THROUGH THE REAR PORTION OF THE THRUST REVERSER DOOR

BACKGROUND OF THE INVENTION

The present invention relates to a pivoting door-type thrust reverser for an aircraft turbojet engine, more particularly one in which the rear portion of the thrust reverser door forms a boundary of a passage enabling a portion of the gases in a gas flow duct to bypass the rear portion of the thrust reverser door and to be redirected obliquely relative to the gas flow duct so as to prevent the bypass gas flow from generating forward thrust when the pivoting door is in its reverse thrust position.

Pivoting door-type thrust reversers for aircraft turbojet engines are well-known in the and typically comprise a thrust reverser door pivotally attached an engine cowling wherein an inner surface of the cowling forms an outer boundary of a gas flow duct. The thrust reverser door is pivotable between a forward thrust position, in which an inner surface of the thrust reverser door forms a portion of the outer boundary of the gas flow duct, and a reverse thrust position in which a front portion of the door moves outwardly from the cowling and a rear portion of the door moves inwardly into the gas flow duct so as to redirect the gases flowing in the gas flow duct outwardly through an opening in the cowling. An inner boundary of the gas flow duct may be formed by a casing enclosing the turbojet engine if the thrust reverser is utilized in a turbofan-type jet engine. In such turbofan-type jet engines, the gas flow duct may contain gas flow including the hot exhaust from the jet engine, as well as the cooler air from the turbofan, or the duct may direct the flow only of air from the turbofan.

The cowling typically has an aerodynamic outer surface, especially in cases in which the turbojet engine is suspended externally from the aircraft, to provide a low drag, aerodynamic airflow around the cowling.

FIG. 1 illustrates a typical thrust reverser for a cowling 1. The thrust reverser door 2 is pivotally attached to the cowling 1 so as to pivot about generally transverse axis 20 between the forward thrust position, illustrated in FIG. 1, and a reverse thrust position (not shown). The cowling has a rear portion 3 that is fixed to the remainder of the cowling by cowling portions extending between circumferentially spaced apart thrust reverser doors. A plurality of thrust reverser doors may be utilized, with the doors being circumferentially spaced apart around the circumference of the cowling 1. Each door may comprise outer panel 4 and inner panel 5. In the forward thrust position, the outer panel 4 is substantially flush with the outer surfaces of the cowling 1 and the rear portion 3 to provide aerodynamic air flow over the cowling structure. When in this position, the inner panel 5 forms a portion of the outer boundary of the gas flow duct 15.

The door 2 is moved between its forward and reverse thrust positions by an actuator 8 connected to a front structure of the cowling 1 and having an extendible and retractable rod attached to the door 2. As is well known in the art, extension and retraction of the rod will cause the door to move between the forward and reverse thrust positions.

When the thrust reverser is in the forward thrust mode, gases pass through the generally annular duct 15 in the direction of arrow 6. When the door is in the reverse thrust position, an opening in the cowling 1 is uncovered and the gases are redirected laterally outwardly through this opening. In the known pivoting door-type thrust reversers, the rear portion of the door 2 which pivots inwardly into the gas flow duct 15 provides substantially total obstruction of the gas flow duct 15. In some instances it is desirable to achieve such maximum obstruction of the gas flow duct during thrust reversal, but in other instances, depending upon the particular geometric and aerodynamic parameters, such maximum obstruction may constitute a drawback. During thrust reversal, it is important that gas flow through the openings in the cowling be of sufficient capacity to prevent stalling of the turbojet engine compressor, or otherwise affecting the operation of the compressor.

Typical pivoting door-type thrust reversers are shown in French Patents 1,482,538 and 2,030,304 and in U.S. Pat. No. 3,605,411.

SUMMARY OF THE INVENTION

A thrust reverser is disclosed for an aircraft turbojet engine having a cowling with an inner surface forming an outer boundary of a gas flow duct, the cowling having at least one reverse thrust opening and a thrust reverser door pivotally attached to the cowling so as to move between a forward thrust position, wherein the thrust reverser door closes the at least one reverse thrust opening and a reverse thrust position, wherein a forward portion of the thrust reverser door moves outwardly from the cowing and a rear portion of the door moves inwardly into the gas flow duct so as to redirect a first portion of the gases flowing through the gas flow duct through to the reverse thrust opening. The thrust reverser also includes a passageway bounded at least in part by the rear portion of the thrust reverser door located in the gas flow duct when the thrust reverser door is in the reverse thrust position, the passageway enabling a second portion of the gases flowing through the gas flow duct to pass to the rear of the thrust reverser door and to redirect this second portion of gases in an oblique direction relative to the gas flow duct to eliminate any forward thrust developed by the second portion of gases.

An object of the present invention is to provide a thrust reverser which provides a controlled leakage passage of the gas flow past the thrust reverser door during reverse thrust operation and to eliminate any forward thrust generated by the gases passing through the passageway.

A further object of the invention is to redirect the gases flowing through the passageway so that these gases also produce a reverse thrust effect.

The passageway may be formed in a rear portion of the pivoting door and be opened and closed by a flap pivotally attached to the thrust reverser door. Alternatively, the passageway may be formed between a rear portion of the door, an engine casing surface and a pivoting rear panel located rearwardly of the thrust reverser door.

Another alterative is to have one or more movable vanes located in the rear of the thrust reverser door such that the vanes are movable into passageway during thrust reversal so as to redirect the gases in the desired direction.

If the passageway is formed by a clearance between the rear portion of the thrust reverser door and a casing enclosing the turbojet engine, the casing may have one or more air jets connected to a source of pressurized air such that air emanating from the jets redirects the gases flowing through the passageway in the desired direction.

BRIEF DESCRIPTION OF THE DRAWINGS

FIG. 1 is a partial, longitudinal cross-sectional view illustrating a known type of pivoting door thrust reverser with the thrust reverser door in the forward thrust position.

FIG. 2 is a perspective view of a thrust reverser door according to the present invention having a passageway formed in a rear portion.

FIG. 3 is a partial, longitudinal, cross-sectional view of a thrust reverser according to the present invention with the thrust reverser door in the forward thrust position.

FIG. 4 is a view similar to FIG. 3, but illustrating the thrust reverser door in the reverse thrust position.

FIG. 5 is a view similar to FIG. 3, illustrating an alternative pivoting flap structure attached to the thrust reverser door.

FIG. 6 is a view similar to FIG. 5, but illustrating the thrust reverser door in the reverse thrust position.

FIG. 9 is a partial, longitudinal, cross-sectional view of a thrust reverser according to the present invention illustrating a second embodiment of the invention utilizing a pivoting flap in conjunction with the thrust reverser door.

FIG. 10 is a view similar to FIG. 9, illustrating the positions of the elements in the reverse thrust mode.

FIG. 11 is a view similar to FIG. 9, illustrating an alternative construction of the pivoting rear flap.

FIG. 12 is a view similar to FIG. 11, illustrating the positions of the elements during reverse thrust operation.

FIG. 17 is a view similar to FIG. 3, illustrating another alternative construction of the pivoting flap attached to the thrust reverser door.

FIG. 18 is a view similar to FIG. 17, illustrating the positions of the elements during reverse thrust operation.

FIG. 19 is a view similar to FIG. 3, illustrating yet another alternative construction of the pivoting flap attached to the thrust reverser door.

FIG. 20 is a view similar to FIG. 19, illustrating the positions of the elements in the reverse thrust mode.

FIG. 21 is a partial, longitudinal, cross-sectional view illustrating another embodiment of applicants' invention with the thrust reverser door in the forward thrust position.

FIG. 22 is a view similar to FIG. 21, illustrating the positions of the elements during reverse thrust operation.

FIG. 23 is a view similar to FIG. 9, illustrating another alternative construction of the pivoting rear panel showing the elements in the forward thrust positions.

FIG. 24 is a view similar to FIG. 23, illustrating the elements in their reverse thrust positions.

DETAILED DESCRIPTION OF THE PREFERRED EMBODIMENTS

Figure 7:
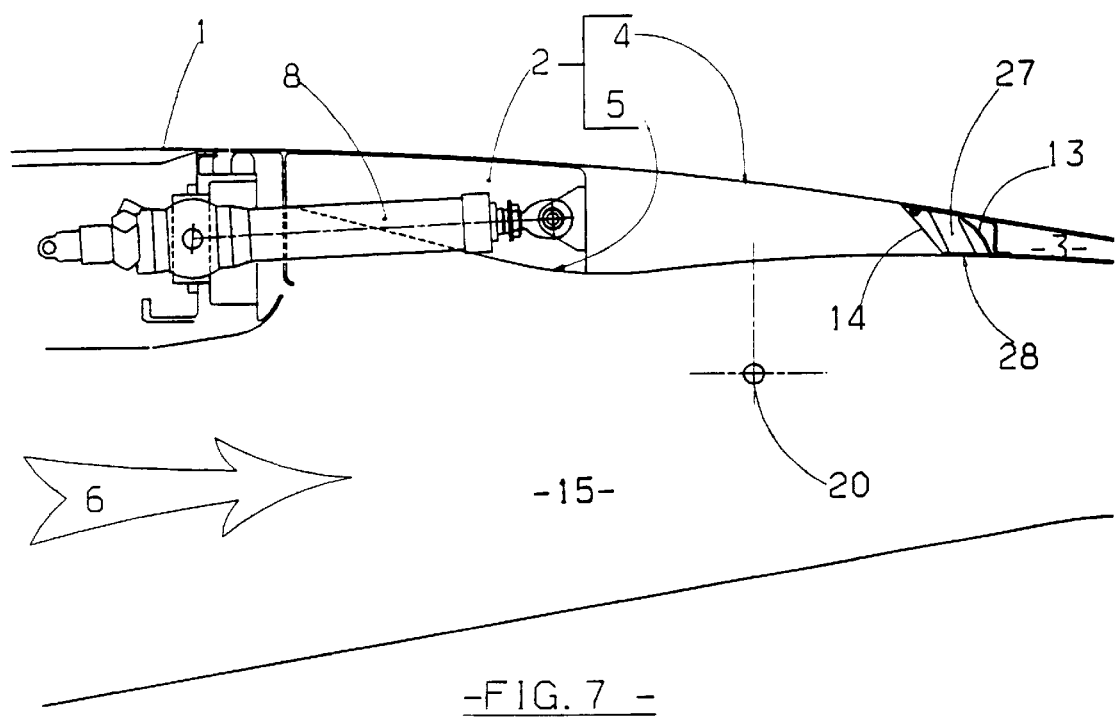
FIG. 7 is a view similar to FIG. 3, illustrating another alternative passageway construction and with the thrust reverser door in the forward thrust position.

FIGS. 2, 3 and 4 illustrate an initial embodiment of applicants' invention in which the thrust reverser door 2 has outer panel 4 and inner panel 5 forming the same functions as in the previously discussed prior art device. A rear portion of the door has a flap 10 pivotally attached thereto so as to pivot about pivot axis 11. The rear portion of the door, which extends rearwardly beyond the pivot axis 20 when in the forward thrust position, has a passageway 12 bounded by two spaced apart walls 13 and 14. The forward wall 14 may also form the rearmost end of the structural portion of the thrust reverser door 2 and connect the outer panel 4 to the inner panel 5. A main function of the rear wall 13 is to deflect and direct a second portion of the gases 17 in a desired direction obliquely to the longitudinal axis of the gas flow duct, as illustrated in FIG. 4. The thrust reverser door, as illustrated in FIG. 2, may also have spaced apart lateral walls 16 extending between the walls 13 and 14 to form lateral boundaries of the passageway 12. The spaced apart lateral walls may or may not be parallel to each other depending upon the direction in which it is desired to direct the second portion of gases 17. Lateral walls 16 may extend generally in a longitudinal direction, may converge toward each other in a rearward direction or may diverge from each other in a rearward direction depending upon the specific requirements of each individual application of applicants' invention.

The position of the movable flap 10 when in the forward thrust position illustrated in FIG. 3 is such that it covers an opening end of the passageway 12 and has a surface 18 that forms a portion of the outer boundary of the gas flow duct 15.

An opposite end of the passageway 12 is covered by flap 3a, in this particular instance integrally formed with the cowling portion 3 and extending forwardly therefrom. An outer surface of the flap 3a is substantially flush with the outer panel 4 and the outer surface of cowling portion 3 when the elements are in their forward thrust positions to provide a smooth aerodynamic flow over the outer surface of the cowling.

A known elastomeric seal may be provided between the flaps 3a and 10, and the ends of the passageway 12 to prevent any leakage through the passageway 12 from the gas flow duct 15 when the elements are in their forward thrust positions.

The flap 10 is moved between its closed position, illustrated in FIG. 3, and its open position, illustrated in FIG. 4, by a control linkrod 21 which has one end connected to the movable rod of the actuator 8 at pivot point 7 and another end affixed to the moveable flap 10 at pivot point 9 displaced from the pivot axis 11. Thus, extension and retraction of the rod of the linear actuator 8 moves the thrust reverser door 2 between the forward and reverse thrust positions and also moves the flap 10 between a closed position, illustrated in FIG. 3, and an open position, illustrated in FIG. 4. Quite obviously, the flap 10 is in its closed position when the thrust reverser door is in the forward thrust position and the flap 10 is in its open position when the thrust reverser door 2 is in the reverse thrust position.

A deflector 19 may also extend from the movable flap 10 such that, when the flap 10 is in the open position, the deflector 19 directs the gases in the gas flow duct 15 towards the passageway 12. As best seen in FIG. 4, when the second portion of the gases 17 pass through the passageway 12 they are redirected obliquely to the axis of the gas flow duct 15 to eliminate any remnant forward thrust they may generate.

A first portion of the gases is directed outwardly through the reverse thrust opening, as illustrated at 6 in FIG. 4. Although the description sets forth only a single passageway 12 in the thrust reverser door 2, it is understood that a plurality of such passageways may be utilized and may be located symmetrically or asymmetrically relative to the center longitudinal axis of the door 2.

FIGS. 5 and 6 illustrate a variation in the pivoting flap construction in which the movable flap 23 is pivotally connected to the door at pivot point 22. The flap 23 is located such that gas pressure from the second portion of gases 17 moves the flap 23 to its open position, as illustrated in FIG. 6. A stop 25 may be provided on the rear portion of the door 2 to limit the travel of the flap 23 in the open position. An adjustable stop 24 extends from the first flap 3a and contacts the movable flap 23 as the thrust reverser door 2 approaches its forward thrust position in order to move the flap 23 to its closed position. When in the open position, the flap 23 also serves to direct the second gas flow 17 in the oblique direction in order to reduce, or even eliminate any remnant forward thrust generated by the second gas flow. Stop 25 may be adjustable so as to insure the optimal location of the flap 23 in its open position. A torsion spring may be attached around pivot axis 22 and may bias the flap 23 toward either its open or its closed position.

Figure 8:
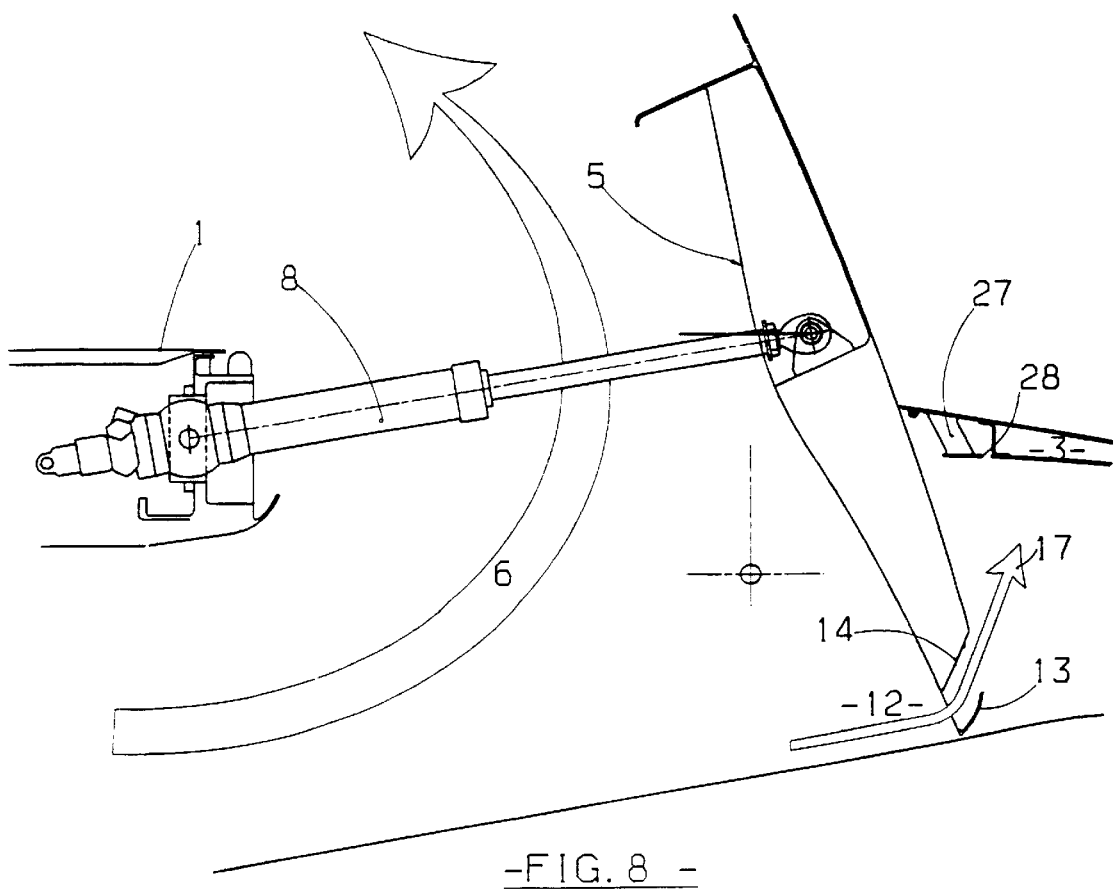
FIG. 8 is a view similar to FIG. 7, illustrating the thrust reverser door in the reverse thrust position.

FIGS. 7 and 8 illustrate another alternative construction of the flap controlling the opening and closing of the passageway 12. As illustrated in these figures, flap 28 is fixedly attached to the rear cowling portion 3 by one or more supports 27. The flap 28 and supports 27 are located such that they enter the passageway 12 when the thrust reverser door is in its forward thrust position, as illustrated in FIG. 7. In this position, the flap 28 closes one end of the passageway 12 and a surface of the flap 28 forms a portion of the outer boundary of the gas flow duct 15.

FIGS. 17 and 18 show another alternative construction for the first and second flap utilized to cover and uncover the opposite ends of the passageway through the thrust reverser door 2. In this construction, a first flap 72 is pivotally connected to the thrust reverser door so as to pivot about axis 71 and second flap 76 is pivotally connected to the thrust reverser door so as to pivot about axis 77. In their closed positions, as illustrated in FIG. 17, flaps 72 and 76 close opposite ends of the passageway extending through the rear portion of the thrust reverser door 2.

A flap actuator 70 is mounted within the thrust reverser door 2 and has an extendible and retractable rod connected to linkrods 78 and 79 at pivot point 80. An opposite end of the linkrod 78 is pivotally connected to the second flap 76 at pivot axis 75, while an opposite end of the linkrod 79 is connected to the first flap 72 at pivot axis 73. As can be seen in FIGS. 17 and 18 extension of the rod of the linear actuator 70 moves the flaps 72 and 76 to their closed positions in which they close opposite ends of the passageway. Retraction of the rod of the linear actuator 70 pivots the first flap 70 about its pivot axis 71 and second flap 76 about its pivot axis 75 inwardly into the thrust reverser door 2 in order to open the passageway through the thrust reverser door. As in the previously constructions, a rear wall 74 directs the second gas flow 17 in a desired direction. In their opened positions, the flaps 72 and 76 form a forward boundary of the passageway opposite to wall 74.

Linear actuator 70 may be actuated in conjunction with the linear actuator of the thrust reverser door 2, or may be actuated independently of the door's linear actuator. As in the previously described constructions, the position of the passageway through the thrust reverser door 2 may be varied according to the desired operational characteristics of any specific installation.

Another alternative construction of the pivoting flap is illustrated in FIGS. 19 and 20. In this construction, flap 23 is pivotally connected to the rear portion of the thrust reverser door 2. As the thrust reverser door 2 approaches its reverse thrust position, a rear portion 23a of the flap 23 will contact the casing 64 enclosing the turbojet engine (not shown) causing the flap 23 to pivot about the pivot axis 22 relative to the thrust reverser door 2. Such pivoting movement moves the flap 23 to its open position thereby uncovering an end of passageway 12.

An opening 3b may be formed in the flap 3a enabling the second portion of gases 17 to exit from the cowling when the door is in the reverse thrust position. A panel 13a, may be attached to the wall 13 and positioned such that it closes the opening 3b when the thrust reverser door is in the forward thrust position, as illustrated in FIG. 19. A torsion spring or the like may be utilized to act on the flap 23 to urge it towards its closed position. Quite obviously, other methods may be used to control the motion of flap 23 without exceeding the scope of the invention.

The invention may also be utilized with a thrust reverser having a rear panel, such as disclosed in French Patent 2,730,764. As illustrated in FIGS. 9 and 10 a pivoting rear panel 29 is pivotally attached to the cowling so as to pivot about axis 36. The rear panel 29 is movable between a retracted position, as illustrated in FIG. 9, and an extended position, as illustrated in FIG. 10. Such movement may be coordinated with the movement of the thrust reverser door 2 between the forward and reverse thrust positions by a control rod 31 pivotally attached to the thrust reverser door at pivot point 34 and pivotally attached to the rear panel 29 at pivot point 35. Thus, movement of the thrust reverser door 2 between the forward and reverse thrust positions will also move the rear panel between its retracted and extended positions.

In this embodiment, the wall 14 of the thrust reverser door 2 forms a boundary of the passage with the engine casing forming an opposite boundary of the passageway. One or more longitudinal walls 32 may extend generally longitudinally from the wall 14 of the thrust reverser door 2 to direct the second gas flow 17 in a desired direction. The longitudinal walls 32 may be mutually parallel, diverging, or converging as desired, and may be arranged either symmetrically or asymmetrically relative to the center axis of the thrust reverser door 2. Walls 37 may extend between longitudinal walls 32 so as to provide improved control over the direction of the second gas flow 17.

The forward portion of the rear panel 29 should be very close to, in or contact with the outer surface of the casing enclosing the turbojet engine, as illustrated in FIG. 10, to prevent any uncontrolled leakage flow pass the rear panel 29. Panel 29 may have surface 30 formed thereon to impart desired directional control to the second gas flow 17.

An alternative construction of the rear panel is illustrated in FIGS. 11 and 12. In this variation, the rear panel 41 is pivotally attached to the cowling and is driven by a linkrod connected it to the thrust reverser door 2 between a retracted position, illustrated in FIG. 11, and an extended position, illustrated in FIG. 12, as in the previously described variation. The rear portion 3 of the cowling has a portion 40 extending forwardly therefrom, which portion has an opening 44 therein. As best seen in FIG. 12, the surface 30 directs the second gas flow 17 outwardly through the opening 44 when in the extended position. A panel 41 is affixed to the rear panel 29 by supports 42 such that panel 41 closes the opening 44 when the rear panel 29 is in its retracted position, as illustrated in FIG. 11.

Figure 13:
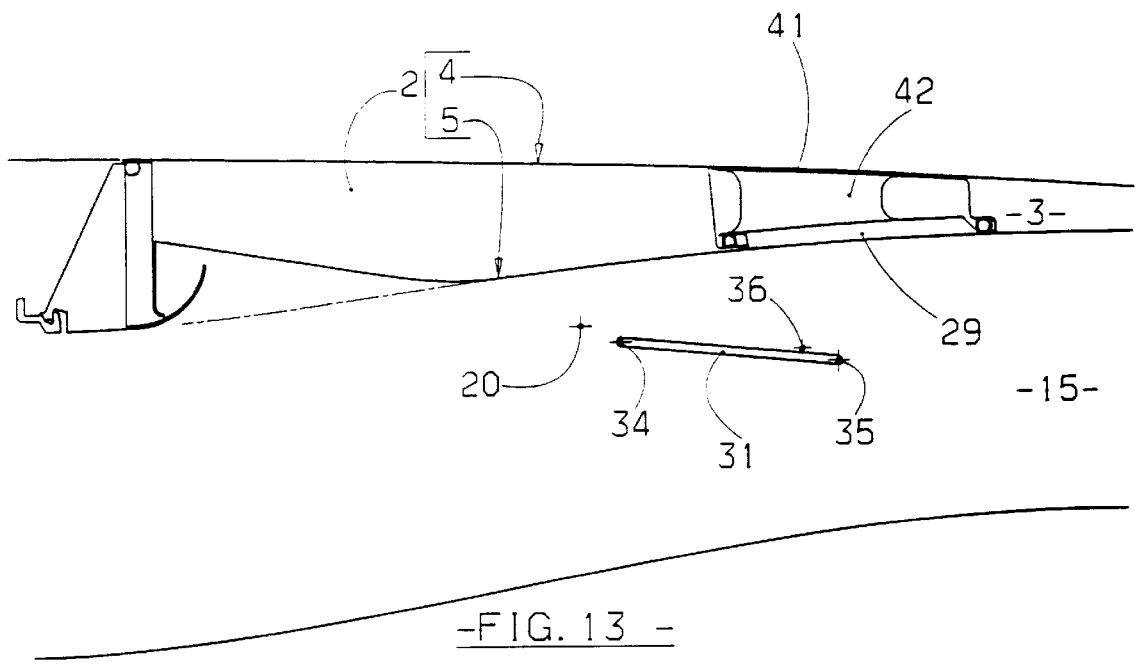
FIG. 13 is a view similar to FIG. 9, illustrating another alternative construction of the rear flap.
Figure 14:
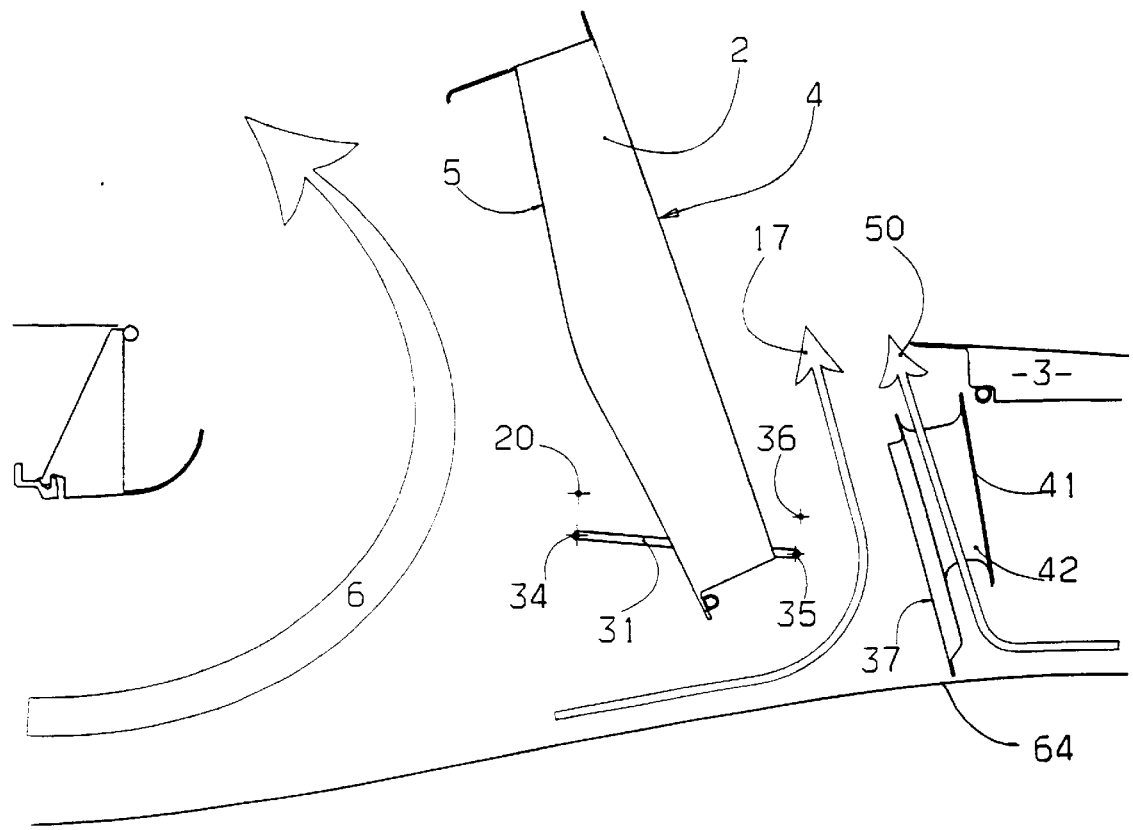
FIG. 14 is a view similar to FIG. 13, illustrating the positions of the elements during reverse thrust operation.

Another variation in construction of the pivoting rear panel is illustrated in FIGS. 13 and 14. Again, rear panel 29 has panel 41 attached thereto such that panel 41 forms a portion of the outer cowling surface when the rear panel 29 is in its retracted position, as illustrated in FIG. 13. The pivot axis 36 of the rear panel 29 is located such that rear panel 29 pivots with respect to its pivot axis in the same direction as the thrust reverser door 2 pivot about its pivot axis 20. Again, linkrod 31 is pivotally connect to the thrust reverser door 2 at pivot axis 34 and to the rear panel 29 at pivot axis 35. An inner surface 37 of the rear panel 29 directs the second gas flow 17 in the desired direction, in this particular instance, it passes outwardly through the cowling. The pivot axis of the rear panel 29 may be stationary in regard to the cowling, or it may be movable (connected to the thrust reverser door) as described in French Patent 2,741,910.

The flow of the secondary gas portion 17 outwardly through the cowling generates a low pressure area within the duct 15 to the rear of the door 2 when in the reverse thrust mode. Such low pressure causes an air flow 50 from the rear portion of the cowling, into the gas flow duct 15 which is directed outwardly through the cowling by rear panel 29. Supports 42 connecting rear panel 29 with panel 41 may be oriented so as to impart a desired direction to the air flow 50. The air flow 50 may enhance cooling of the second gas flow 17 and may improve the cooling of the rear portion of the engine casing 64.

Another variation in the construction of the rear panel is illustrated in FIGS. 23 and 24. In this construction, the rear panel 81 is not pivotally connected directly to the cowling 3, but is, instead, connected to the thrust reverser door 2 by linkrods 84 and 85 which, together with the thrust reverser door 2 and the rear panel 81 form a four bar parallelogram linkage. Linkrod 84 is pivotally connected to the thrust reverser door at pivot point 88 and to the rear panel 81 at pivot point 87. Linkrod 85 is pivotally connected to the thrust reverser door at pivot point 89 and to the rear panel 81 at pivot point 86. A control rod 83 is also connected to the thrust reverser door actuator rod at pivot point 90 and to the rear panel at pivot point 91. As the thrust reverser door pivots about its stationary pivot axis 20, the rear panel 81 is moved between the retracted position, illustrated in FIG. 23, and the extended position, illustrated in FIG. 24. The linkage connecting the rear panel 81 with the thrust reverser door 2 is such that, as the thrust reverser door is moved toward the reverse thrust position, the rear panel 81 is moved to the rear so as to form a passageway therebetween to accommodate the second gas flow 17. Surface 92 and portion 81*a* impart the desired direction to the second gas flow 17 as it exits from the cowling. Portion 81*a* also covers the opening in the thrust reverser door necessary to accommodate the control rod 83 which extends through the outer surface of the thrust reverser door 2 as illustrated in FIG. 24.

Figure 15:
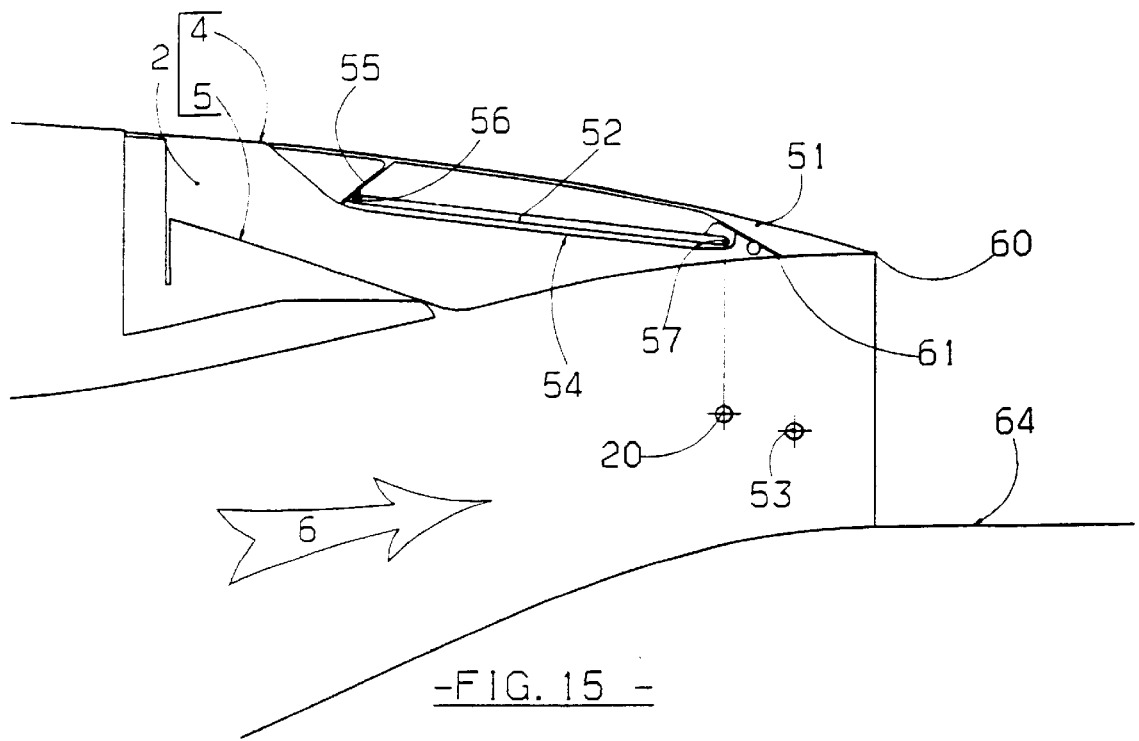
FIG. 15 is a view similar to FIG. 9, illustrating the use of the pivoting rear flap as a rearmost edge of the cowling.
Figure 16:
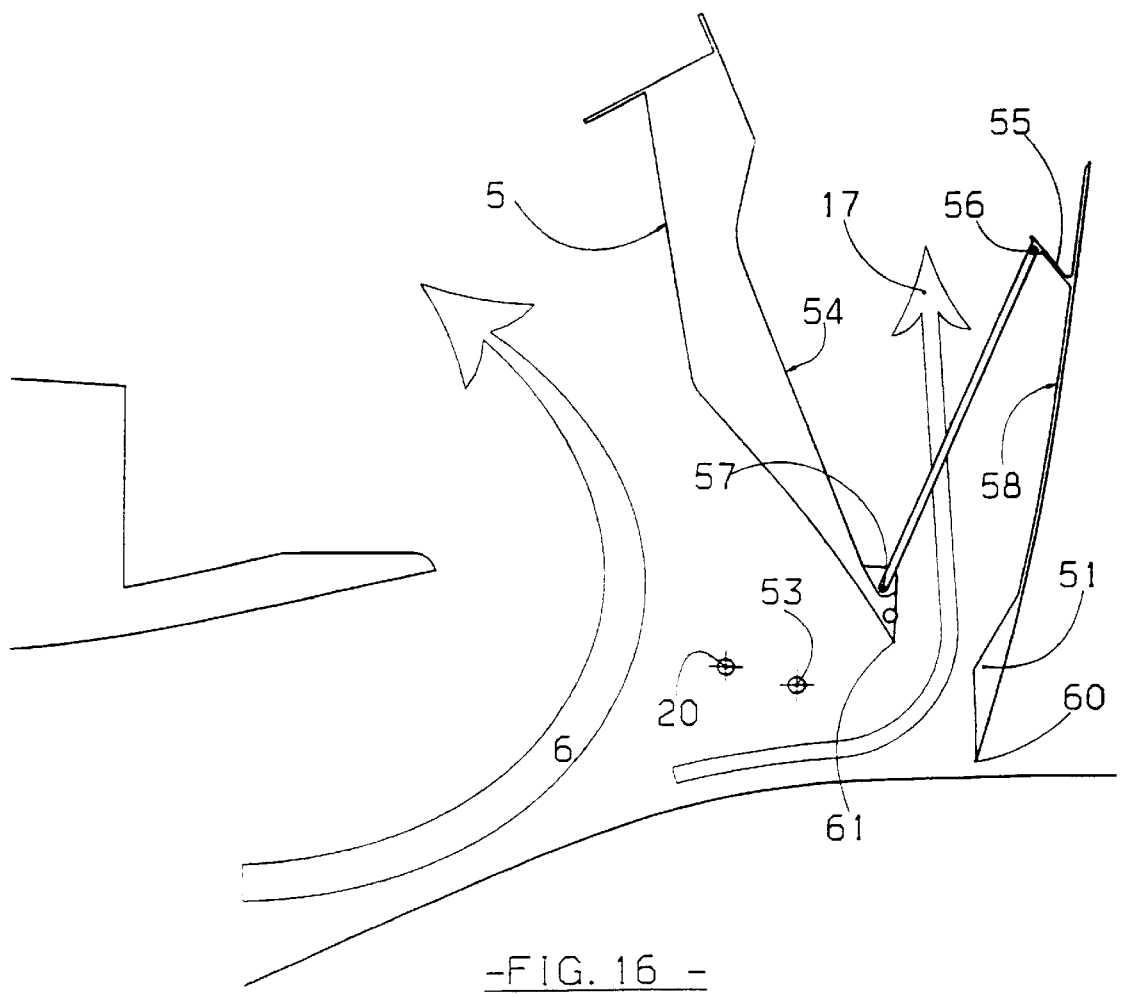
FIG. 16 is a view similar to FIG. 15, illustrating the positions of the elements during reverse thrust operation.

A rearmost portion of the rear panel may also form the rearmost portion of the cowling, as illustrated in FIGS. 15 and 16. As can be seen, the rearmost edge of the rear panel 51 also forms the rearmost edge of the cowling. The rear panel 51 is pivotally attached to the cowling so as to pivot about axis 53, while the thrust reverser door 2 pivots bout axis 20. In the forward thrust position of the door 2 as illustrated in FIG. 15, the rear panel 51 is in its retracted position in which a front portion covers a cavity 54 formed in an outer surface of the thrust reverser door 2 in order to accommodate a control rod 52 connected to the thrust reverser door at pivot 57 and to the rear panel 51 at pivot 56. The control rod 52 moves the rear panel 51 between its retracted and extended positions as the thrust reverser door moves between its forward and reverse thrust positions. The rear panel 51 has an inner control surface 58 and a deflector 55 extending inwardly from the rear panel which impart a desired direction to the second gas flow 17, as illustrated in FIG. 16. The rearmost edge 60 of the rear panel 51 is positioned close to, or in contact with the outer surface of the casing 64 so as to direct the second gas flow 17 in the desired direction and to prevent any leakage to the rear past the rear panel 51.

Although the axis of rotation 53 of the rear panel 51 is illustrated as being displaced from the axis of rotation 20 for the thrust reverser door 2, a common axis of rotation for these elements may be utilized in cases in which the displacement of the rear flap 51 is implemented by the parallelogram-type four bar linkage. The pivot axis 53 may be located in the thrust reverser door 2, in which case the control rod 52 has one end connected to the cowling structure.

A third embodiment of applicants' invention is illustrated in FIGS. 21 and 22, wherein one or more deflecting vanes 66 are movably attached to a rear portion of the thrust reverser door 2 by a structure 65 which enables the vanes 66 to be moved between retracted positions, illustrated in FIG. 21, and extended positions, illustrated in FIG. 22. When extended, the vanes 66 are located in the passageway and impart a desired direction to the second gas flow 17. In their retracted position, the vanes 66 lie closely adjacent to the rear wall of the thrust reverser door 2 enabling it to move into the forward thrust position. The movable structure 65 may include known pneumatic, hydraulic, or electric actuators which may be controlled either in conjunction with the position of the thrust reverser door 2, or independently of the position of the thrust reverser door.

Figure 26:
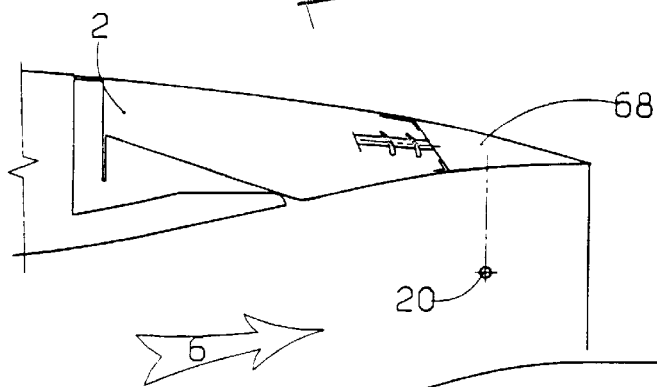
FIG. 26 is a view similar to FIG. 21 wherein the thrust reverser door forms a rearmost edge of the cowling.
Figure 27:
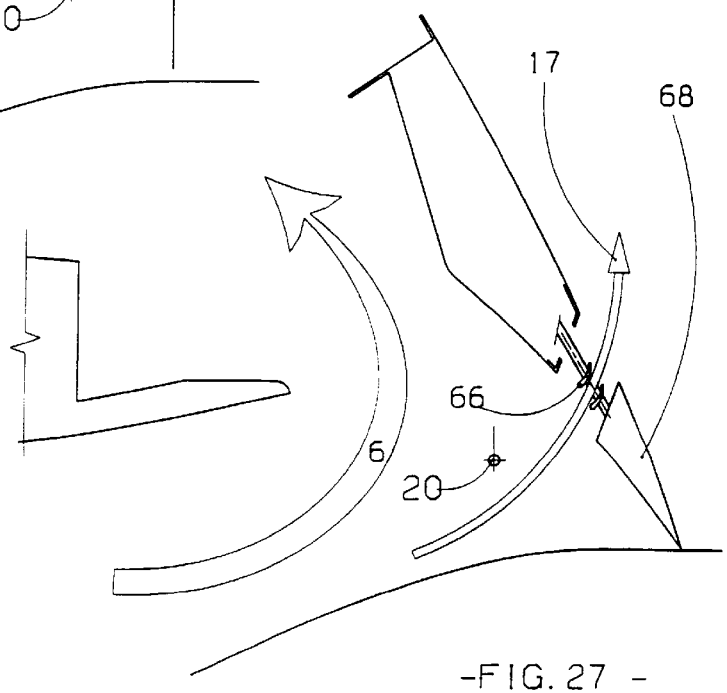
FIG. 27 is a view similar to FIG. 26 illustrating the elements in their reverse thrust positions.

This embodiment may also be utilized in structures in which the rearmost portion of the thrust reverser door forms the rearmost edge of the cowling, as illustrated in FIGS. 26 and 27. In this variation, the rear cowling portion 68 is attached to the mechanism 65 such that, when the vanes 66 are in their extended positions, the cowling portion 68 moves to the rear of the rear wall of the thrust reverser door 2 so as to form the passageway through which the second gas flow 17 passes, as illustrated in FIG. 27. In its retracted position, cowling portion 68 forms a continuation of the thrust reverser door 2 to provide aerodynamically smooth flows over the exterior surface of the cowling, as well as within the gas flow duct.

Figure 25:
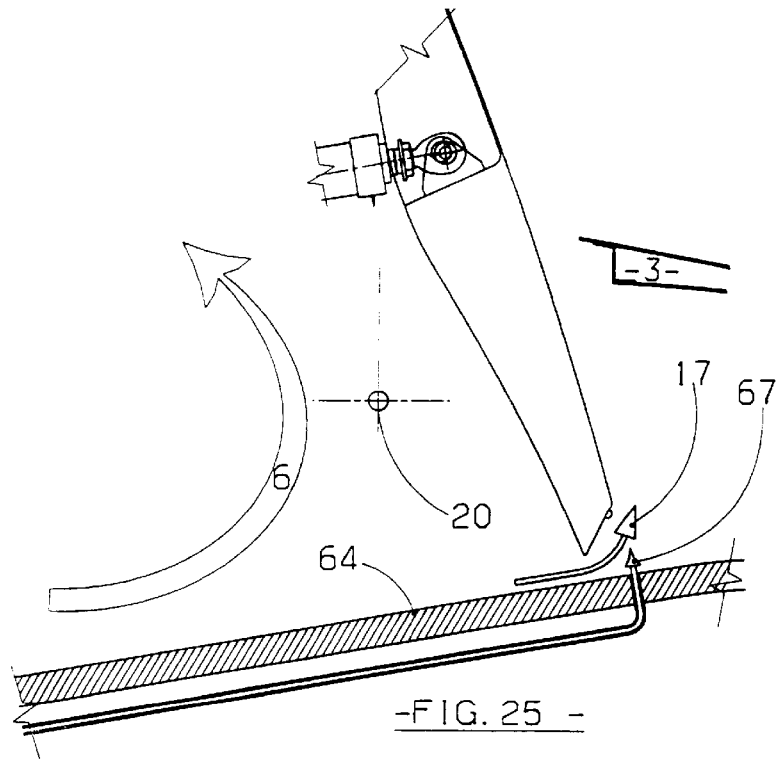
FIG. 25 is a partial, longitudinal, cross-sectional view of an alterative embodiment of applicants' invention with the thrust reverser door in the reverse thrust position.

A fourth embodiment of applicants' invention is illustrated in FIG. 25. In this embodiment, the casing 64 enclosing the turbojet engine (not shown) has one or more airjet orifices formed such that an air flow 67 emanating from the orifices imparts the desired directional control to the second gas flow 17. The orifices may be connected to a source of pressurized air, such as the turbojet engine compressor, in known fashion to supply the controlling air to the orifices. The orifices are located so as to achieve the optimal control of the second gas flow 17.

The foregoing description is provided for illustrative purposes only and should not be construed as in any way limiting this invention, the scope of which is defined solely by the appended claims.

We claim:

1. A thrust reverser for an aircraft turbojet engine having a cowling with an inner surface forming an outer boundary of a gas flow duct, the cowling having at least one reverse thrust opening, the thrust reverser including a thrust reverser door pivotally attached to the cowling so as to move between a forward thrust position, in which the thrust reverser door closes the at least one reverse thrust opening, and a reverse thrust position, in which forward position of the thrust reverser door extends outwardly from the cowling and a rear portion of the thrust reverser door extends into the gas flow duct so as to redirect a first portion of the gases flowing through the gas flow duct through the at least one reverse thrust opening, the thrust reverser having a passageway extending completely through the rear portion of the thrust reverser door and opening to an outer surface of the thrust reverser door such that when the rear portion of the thrust reverser door is located in the gas flow duct when the thrust reverser door is in the reverse thrust position, the passageway passes a second portion of the gases flowing through the gas flow duct to the outer surface of the thrust reverser door and redirects the second portion of gases in an oblique direction relative to the gas flow duct.

2. The thrust reverser of claim 1 further comprising first and second spaced apart walls in the rear portion of the thrust reverser door bounding opposite side of the passageway.

3. The thrust reverser of claim 2 further comprising spaced apart lateral walls bounding opposite lateral sides of the passageway.

4. The thrust reverser of claim 1 further comprising:
   a) a first flap located so as to cover a first end of the passageway when the thrust reverser door is in the forward thrust position; and,
   b) a second flap covering a second end of the passageway when the thrust reverser door is in the forward thrust position.

5. The thrust reverser of claim 4 wherein the second flap is pivotally attached to the thrust reverser door so as to be movable between an open position in which it opens the second end of the passageway and a closed position wherein it covers the second end of the passageway.

6. The thrust reverser of claim 5 further comprising a deflector extending from the second flap so as to direct gases in the gas flow duct toward the second end of the passageway when the second flap is in the open position.

7. The thrust reverser of claim 5 wherein the thrust reverser has a door actuator connected to the thrust reverser door to move the thrust reverser door between the forward and reverse thrust positions, the thrust reverser further comprising a linkage mechanism connecting the door actuator and the second flap such that the second flap is moved to the open position when the thrust reverser door is moved to the reverse thrust position and the second flap is moved to the closed position when the thrust reverser door is moved to the forward thrust position.

8. The thrust reverser of claim 5 further comprising a first stop extending from the first flap and located so as to contact the second flap when the thrust reverser door is in the forward thrust position and move the second flap to the closed position.

9. The thrust reverser of claim 8 further comprising a second stop on the thrust reverser door located so as to contact the second flap when the second flap is in the open position.

10. The thrust reverer of claim 5 wherein the first flap is pivotally attached to the thrust reverser door so as to move between an open position in which the first end of the passageway is open and a closed position in which the first end of the passageway is closed by the first flap.

11. The thrust reverser of claim 10 further comprising a flap actuator connected to the first and second flaps so as to move the first and second flaps between the open and closed positions.

12. The thrust reverser of claim 5 wherein the turbojet engine includes a casing forming an inner boundary of the gas flow duct and wherein the second flap is located so as to contact the casing when the thrust reverser door moves toward the reverse thrust position, such contact causing the second flap to move to the open position.

13. The thrust reverser of claim 4 further comprising at least one support fixedly connecting the second flap to the cowling.

14. The thrust reverser of claim 1 further comprising:
   a) a pivoting rear panel located rearwardly of the thrust reverser door so as to be movable between a retracted position in which an inner surface forms a portion of an outer boundary of the gas flow duct and an extended position in which at least a portion of the rear panel directs the second portion of gases obliquely with respect to the gas flow duct; and,
   b) an actuating mechanism to move the rear panel to the retracted position when the thrust reverser door is moved to the forward thrust position, and to move the rear panel to the extended position when the thrust reverser door is moved to the reverser thrust position.

15. The thrust reverser of claim 14 wherein the actuating mechanism comprises a linkrod mechanism connecting the rear panel to the thrust reverser door.

16. The thrust reverser of claim 15 wherein the linkrod mechanism comprises a four bar linkage.

17. The thrust reverser of claim 14 further comprising a plurality of longitudinal walls extending generally rearwardly from a rear side of the thrust reverser door.

18. The thrust reverser of claim 14 comprising at least one guide surface on the rear panel so as to guide the second portion of gases in a predetermined direction when the rear panel is in the extended position.

19. The thrust reverser of claim 14 wherein the rear panel is pivotally connected to the cowling.

20. The thrust reverser of claim 14 further comprising a rearmost edge on the rear panel, the rearmost edge of the rear panel also comprising a rearmost edge of the cowling.

21. The thrust reverser of claim 1, further comprising at least one deflecting vane attached to the thrust reverser door so as to be located in the passageway when the thrust reverser door is in the reverse thrust position so as to direct the second portion of the gases in the oblique direction.

22. The thrust reverser of claim 21 wherein the at least one deflecting vane is movably attached to the thrust reverser door so as to be movable between extended and retracted positions.

23. The thrust reverser of claim 21 further comprising a rearmost cowling position connected to the at least one movable guide vane so as to move therewith.

24. The thrust reverser of claim 1 wherein the turbojet engine includes a casing forming an inner boundary of the gas flow duct and further comprising at least one air jet orifice in the casing located adjacent to the passageway and connected to a pressurized air source such that air emanating from the at least one air jet deflects the second portion of the gas flow obliquely to the gas flow duct.

* * * * *